July 9, 1963 L. M. LITZ ETAL 3,097,068
CRYSTALLIZATION OF PURE SILICON PLATELETS
Filed May 29, 1959 2 Sheets-Sheet 1

INVENTORS
LAWRENCE M. LITZ
ROBERT A. MERCURI
STANLEY A. RING

BY
ATTORNEY

July 9, 1963 L. M. LITZ ETAL 3,097,068
CRYSTALLIZATION OF PURE SILICON PLATELETS
Filed May 29, 1959 2 Sheets-Sheet 2

INVENTORS
LAWRENCE M. LITZ
ROBERT A. MERCURI
STANLEY A. RING
BY
ATTORNEY

United States Patent Office 3,097,068
Patented July 9, 1963

---

3,097,068
CRYSTALLIZATION OF PURE SILICON PLATELETS
Lawrence M. Litz, Lakewood, Robert A. Mercuri, Westlake, and Stanley A. Ring, Cleveland, Ohio, assignors to Union Carbide Corporation, a corporation of New York
Filed May 29, 1959, Ser. No. 816,760
5 Claims. (Cl. 23—223.5)

This invention relates to a process for the purification of silicon and to an apparatus therefor. It more particularly relates to a process of purifying silicon by recrystallization thereof from a molten solvent.

Silicon is an extremely important material in modern day electronics. It is used, in its purest form, as a base for transistors, and it also finds application in rectifiers and solar batteries where the purity standards, though high, are not as exacting as for transistor uses. A great many processes are available or have been proposed to make silicon in all degrees of purity. Some of the more common of these processes include the recrystallization of silicon of very good purity from a metallic vapor, the reduction of purified silicon tetraiodide, and zone refining of impure silicon. In each case, the conventional processes either result in very pure products at extremely high cost or in products of inadequate purity.

A well-known method of purification, that of recrystallizing silicon from a suitable solvent, such as molten tin, zinc, aluminum, silver or indium antimonide, has been tried many times in the past. However, these attempts have had little or no apparent success. Since most of these solvent materials may be obtained in high purity at reasonable cost, it would be greatly advantageous to devise a process, utilizing the solubility differential of silicon in these solvents at different temperatures, from which silicon of good purity may be recovered at a reasonable cost.

It is therefore the primary object of this invention to provide an inexpensive process for the production of relatively pure silicon.

Another object of this invention is to provide a process for the purification of silicon which may be operated continuously.

A further object of this invention is to provide an apparatus for continuously purifying silicon.

Fulfilling these objects, this invention comprises crystallizing purified silicon from a solvent aluminum bath. Because silicon and aluminum form a eutectic at a composition of approximately 11 atomic percent silicon—89 atomic percent aluminum, silicon of good purity may be precipitated out of a super-saturated aluminum solution at reasonable temperatures.

While this process may be carried out in conventional equipment, it is preferred in the practice of this invention to use an apparatus similar to that shown in the accompanying drawings in which.

More particularly, a solution containing more than 11 atomic percent silicon is prepared by dissolving crude chunk silicon in molten aluminum at a temperature higher than the freezing point of the silicon-aluminum eutectic. The temperature is reduced to decrease the solubility of silicon, but maintained above the eutectic freezing point, thus causing platelets of pure silicon to solidify in the aluminum-silicon solution. Upon removing the solidified silicon platelets from the solution, a coating of the silicon-aluminum solution solidifies on the platelets and must be removed to obtain the pure silicon product. It is important to note that the purity of the solidified silicon platelets and the purity of the silicon in the silicon-aluminum solution coated thereon is quite different. It is thought that the reason for this difference lies in the fact that the platelets solidify out of the solution above the eutectic temperature at which temperature the impurities from the crude silicon remain dissolved in the molten silicon-aluminum solution.

Figure 1:
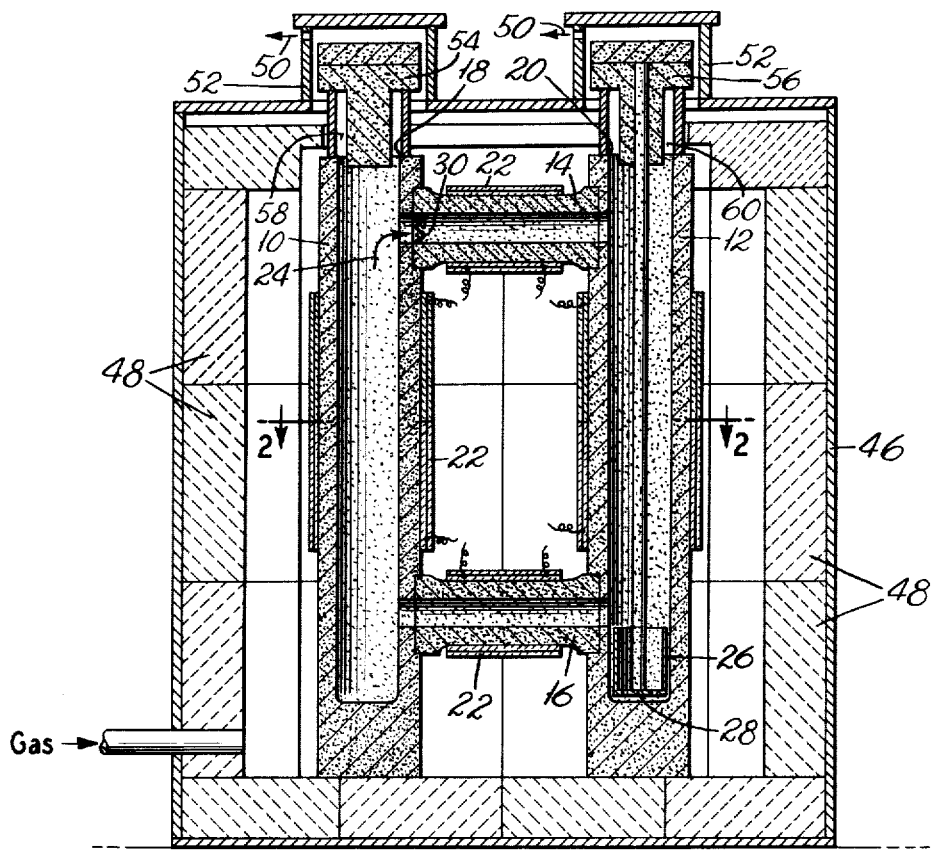
FIG. 1 is a vertical section of a purification loop.
Figure 2:
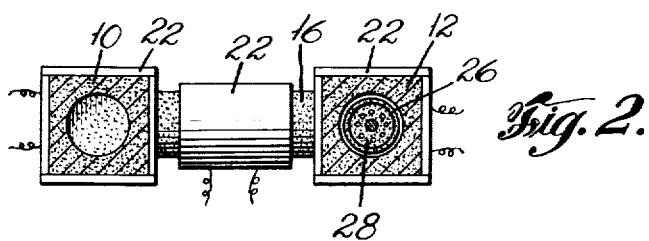
FIG. 2 is a section taken along the lines 2—2 in FIG. 1 looking in the direction of the arrows.

With reference to FIGS. 1 and 2 of the accompanying drawings, a closed circuit loop is formed by joining two upright hollow legs 10 and 12 with two hollow horizontal members 14 and 16. While it is preferred to fashion the members of this loop out of graphite, it will be obvious that any refractory material able to withstand the necessary corrosive conditions and temperatures involved in this purification will suffice. Graphite is preferred because the silicon-aluminum solution does not substantially wet its surface and therefore impurities cannot be picked up in this manner. Each of the upright legs 10 and 12 is suitably provided with apertures 18 and 20, one of which is used to charge solvent aluminum and crude silicon to the purification loop, and the other of which is used to remove purified silicon from the loop.

In order to maintain the necessary operating temperature, a heat source 22 is provided along each of the legs 10 and 12 and along each of the horizontal members 14 and 16. Any conventional material may be used to provide the heat required. If electric heating is used, the heating element should be properly insulated by a ceramic or the like from the purification loop itself.

It is important that a temperature differential be maintained between the two upright legs in the purification loop so that crystallization of purified silicon takes place; thus the dissolution leg 10 must be at a higher temperature than the collection leg 12, and suitably the horizontal members 14 and 16 should have higher temperatures than either of the upright legs 10 and 12. Of particular importance in the practice of this invention is the fact that the apparatus above described can be operated continuously. The temperature differential necessary for crystallization of the pure silicon also provides thermal convection which acts as the driving force to maintain the mass transfer from the hot to the cold side of the loop. In order to insure proper mass transfer, the higher horizontal member 14 must be kept at a higher temperature than the dissolution leg 10 and the lower horizontal member 16 must be maintained at a higher temperature than the collection leg 12. Thus, with reference to FIG. 1, mass flow will be maintained in a clockwise direction as shown by arrow 24. It is obvious that the direction of mass flow is immaterial since, if the dissolution leg 10 and the collection leg 12 were to be reversed in position, the mass flow would then be in a counterclockwise direction and the purification loop would operate in exactly the same manner as above described. The thermal mass transfer may be accelerated by the use of suitable mechanical pumping means though such has been found to be unnecessary.

Conveniently, the product of the crystallization may be collected in the collection leg 12 by means of a dipper type of apparatus such as shown in FIG. 1. Suitably, a refractory cup or plate 26 with a finely perforated bottom 28 may be lowered into the collection leg 12 in order to collect the purified platelets as they precipitate out of the solution. It may be desirable to remove this collector at specified intervals and recover the product therefrom or to collect the product in some other continuous or semi-continuous fashion.

It is advisable to place a wide mesh screen 30 across the of the higher horizontal member 14 nearest the dissolution leg 10 in order to keep large chunks of undissolved crude charge from being transported through the system and contaminating the product. It is also desirable to maintain the solution level above the upper horizontal cross member 14 to insure continuous efficient operation of the system.

Figure 3:
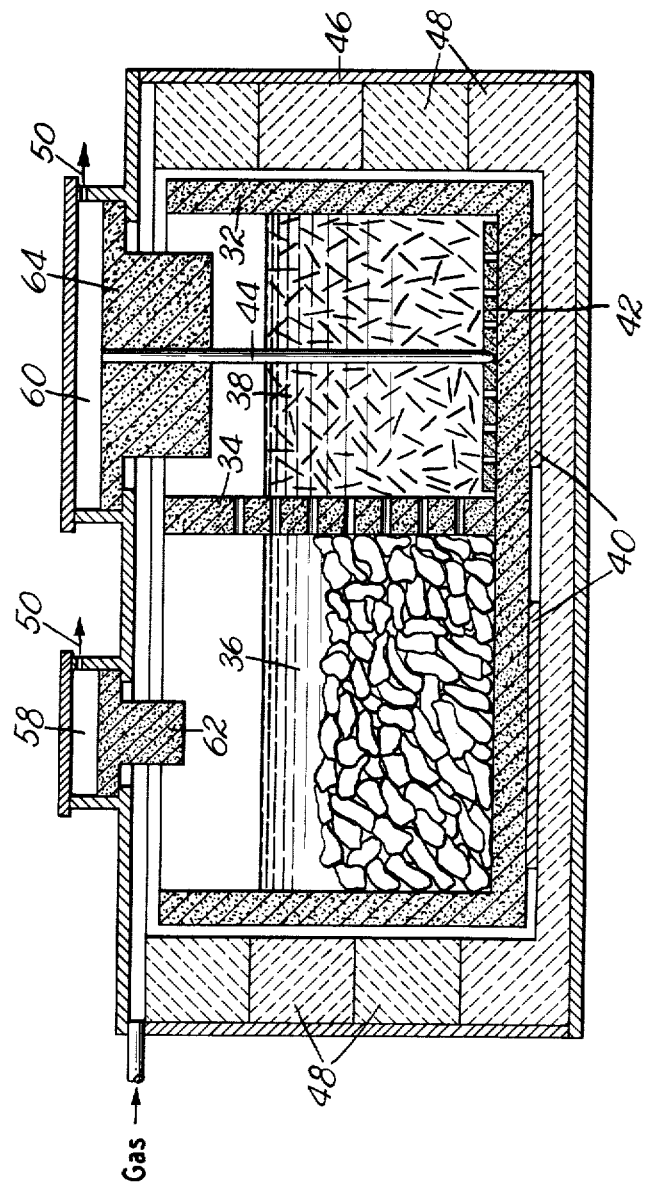
FIG. 3 is a vertical section of a pot-type purification apparatus.

The purification process may be conveniently carried out in a pot-type vessel such as shown in FIG. 3. In this apparatus, a refractory pot 32 is adapted to use in this invention by inserting a perforated plate separator 34 therein which defines a dissolution compartment 36 and a collection compartment 38, the dissolution compartment 36 preferably being larger than the collection compartment 38. At least one heater 40 is arranged in proximity to these compartments and adjusted so as to maintain a temperature differential therebetween. It is most desirable to maintain the perforated separator 34 at a higher temperature than even the dissolution compartment 36 to thereby protect against silicon precipitating in the perforations. Collection of the crystallized silicon is accomplished by placing a finely perforated refractory cup or plate 42 on the bottom of the collection compartment 38 with a long refractory handle 44 extending therefrom through the compartment to facilitate handling of the collector 42. As in the loop apparatus, it is preferred to construct all the members of the pot-type apparatus of graphite in order to minimize contamination.

Depending upon the material used to construct the pot or loop, it may be desirable to blanket such in an inert atmosphere in order to protect it against air oxidation. This is of particular importance if graphite is the construction material. The hazard of oxidation increases as the operating temperature of the apparatus increases and so the inert blanket becomes more desirable as the temperature increases. This condition may be obviated by installing the apparatus in a steel or refractory box 46 insulated with fire brick 48 as shown in FIGS. 1 and 3, and by constantly flushing the box with inert gas as shown at 50.

In the construction of the loop, it would be necessary to have chimneys 52 of a refractory material concentric with the apertures 18 and 20 in the collection and dissolution legs 10 and 12 in order to provide ready access to the loop. Further, in order to keep heating losses to a minimum, it would be advantageous to insert plugs 54 and 56, preferably of the same material as the loop, into the apertures when they are not in use. It is also necessary to provide access to the steel or refractory box 46 in the pot-type apparatus. This may be arranged by providing a charging port 58 in proximity to the dissolution compartment 36 and a collecting port 60 in proximity to the collection compartment 38. These ports 58 and 60 may conveniently be closed by plugs 62 and 64 inserted therein.

The process of this invention takes advantage of the fact that the impurities in crude silicon are retained by an aluminum solvent while purified silicon is being precipitated from the solution. Though this characteristic of polyphase solutions has been recognized in the past, the fact that a much purer silicon solidifies out of a supersaturated aluminum-silicon solution above the eutectic temperature than at this temperature has not been known or used. According to this invention, the purification loop may be continuously operated above the eutectic temperature thereby providing a continuous source of the very pure silicon which has been precipitated above the eutectic melting point and also a corresponding amount of impure silicon-aluminum solution which adheres to the pure platelets and solidifies thereon upon cooling to below the eutectic temperature. While the product is conveniently made in this continuous fashion, it has been found best to collect this product intermittently during predetermined periods.

The process is carried out by charging relatively pure aluminum and crude chunk silicon to the dissolution zone, melting the aluminum and dissolving part of the crude silicon therein and then setting up the temperature differential in the upright legs and the horizontal members of the loop or between the dissolution and collection compartments of the pot-type apparatus. It is preferred that the temperature of the collection zone be higher than that of the dissolution zone during start up so as to prevent precipitation of silicon in the collection zone prior to the attainment of the desired operating temperature. When the desired operating temperature has been attained, the temperature differential between the dissolution zone and collection zone is reversed by adjusting the heat source so that the dissolution zone is kept at a higher temperature than the collection zone. Mass transfer by thermal convection then transports the solution from the hotter dissolution zone to the cooler collection zone where the solidified platelets may be periodically removed.

Crude silicon and make-up aluminum may be added periodically to the dissolution zone to replace that removed during collections and to permit continuous operation. The purified silicon platelets collected consist of an agglomerated mass of pure silicon platelets dispersed in a mass of solidified silicon-aluminum solution. The aluminum in such mass may be removed conveniently by a hydrochloric acid wash, leaving relatively pure silicon platelets and relatively impure silicon powder. These are separated by any convenient means, such as screening or flotation, for example, and the platelets may be washed, first with nitric acid and then with hydrofluoric acid, to remove traces of copper, alumina or silica which are retained on the platelet surface. This produces silicon of a purity of about 99.98 percent with the 0.02 percent impurity content being mostly occluded or dissolved material which the acid washes cannot reach. This impurity content, made up predominantly of aluminum with traces of copper and boron, is sufficiently high to render the silicon too impure for transistor use, but is admirably suited for the other uses described above.

In order to reduce the aluminum content of the purified platelets further, the platelets may be melted in a crucible and treated with silicon tetrachloride vapor for several hours. Samples treated accordingly have been analyzed and have been found to contain as little as nine parts per million aluminum.

The following may be cited as specific examples of this invention:

*Example I*

A graphite purification loop having 2.5 inch inside diameter collection and dissolution legs and 1 inch inside diameter horizontal members was charged with 4482 grams of aluminum and 1533 grams of crude silicon. The aluminum was melted and the silicon dissolved therein as the loop was brought to a temperature of 750° C. During this period, the dissolution leg was kept at a lower temperature than the collection leg. The collector was then inserted into the collection leg and the temperature differential reversed so that the collection leg was 733° C. and the dissolution leg was at 750° C. at which time purified platelets started to form in the collection leg. After about one half-hour, the collector was removed and a new collector was inserted. Each such collection contained approximately 100 grams of crystallized platelets plus frozen solution adhered thereto. The loop was intermittently operated for 5 hours during which time sufficient product was collected in nine collections so that after acid washing, and separating the platelets from the powder, 807 grams of pure silicon platelets were recovered. It was necessary to add 3579 grams of aluminum and 2394 grams of crude silicon as make-up material during this run.

*Example II*

A graphite purification loop substantially similar to the one described in Example I was charged with 3012 grams of aluminum and 1170 grams of crude silicon.

After 90 minutes of intermittent operation with the collection leg at 765° C. and the dissolution leg at 780° C., enough product was collected so that after acid washing and separating, 21 grams of purified silicon platelets were recovered.

*Example III*

A graphite purification loop substantially similar to the one described in Example I was charged with 3009 grams of aluminum and 1287 grams of silicon. After 60 minutes of operation with the collection leg at 817° C. and the dissolution leg at 837° C., enough product was collected so that after acid washing and separating, 62 grams of purified silicon platelets were recovered.

*Example IV*

A graphite purification loop substantially similar to the one described in Example I was charged with 4482 grams of aluminum and 1533 grams of silicon. The loop was operated for 6 hours at a dissolution leg temperature of 771° C. and a collection leg temperature of 755° C. During this run, 1623 grams of aluminum and 1043 grams of silicon were added to the loop and sufficient product was collected during this time so that after acid washing and separating, 378 grams of purified silicon platelets were recovered.

*Example V*

A batch process purification was carried out in a graphite crucible protected with an argon atmosphere contained in a quartz envelope. The crucible was charged with 1148 grams of aluminum and 650 grams of crude chunk silicon, and the temperature of the system raised to 950° C. in order to melt the entire charge. This molten charge was then cooled to 577° C. over a period of 2 hours. After cooling the charge to room temperature, acid washing it and separating the platelets from the impure product, 372 grams of purified silicon platelets were recovered. This recovery represented a yield of about 83 percent of the amount theoretically recoverable.

*Example VI*

A batch process purification was carried out in a graphite crucible identical to that used in Example V. The crucible was charged with 834 grams of aluminum and 467 grams of crude chunk silicon, and the temperature of the system raised to 950° C. in order to melt the entire charge. This molten charge was then slowly cooled to 577° C. A subsequent cooling of the charge to room temperature, acid washing and separating thereof resulted in the recovery of 251 grams of purified silicon platelets which represented a yield of 77 percent of theoretical.

*Example VII*

A batch process purification was carried out in a graphite purification loop substantially similar to that used in Example I. The loop was charged with 7989 grams of aluminum and 4404 grams of crude chunk silicon. With the temperature of the dissolution leg at 780° C. and the collection leg at 757° C., 613 grams of purified silicon platelets and adhering silicon-aluminum solution were withdrawn. This yielded enough product so that after acid washing and separating, 106 grams of purified silicon platelets were recovered.

*Example VIII*

A graphite purification loop substantially similar to the one described in Example I, having been initially charged with 4482 grams of aluminum and 1533 grams of crude chunk silicon, was operated for 65 minutes with its dissolution leg at 803° C. and its collection leg at 800° C. During this time, 694 grams of purified silicon platelets and silicon-aluminum solution frozen thereto were recovered. After acid washing and separation of the pure platelets from the rest of the recovered product, by screening the platelets out on a 20 mesh (Tyler standard) screen, a yield of 144 grams of pure silicon was obtained.

While the crude silicon charged in each of these examples contained about 3 percent iron, spectroscopically determined smaller amounts of aluminum, calcium, manganese, magnesium, and copper, and trace amounts of boron, sodium, titanium, and chromium, samples of the pure product were analyzed and found to contain only 2 to 5 parts per million copper, 200 to 700 parts per million aluminum, and 6 parts per million boron.

It will be obvious to those skilled in the art that many modifications of the apparatus here shown are possible without departing from the spirit of this invention. Thus, as noted above, the construction material may include ceramic or other substantially inert refractory materials instead of graphite. So too, the shape of the loop may be varied to include rounded corners or even modified circular or elliptical shapes.

As to the continuous process described above, it is to be noted that neither the temperature nor the temperature differential is critical so long as the temperature of the collection region is maintained above 577° C., the silicon-aluminum eutectic temperature, and below the melting point of pure silicon. In other batch processes, the entire silicon-aluminum charge may simply be completely melted and then at least a portion of the volume, which may be termed a collection region, cooled to a temperature between the melting temperature of silicon and the eutectic melting temperature.

What is claimed is:

1. A continuous process for preparing at least 99.9 percent pure silicon which comprises dissolving at elevated temperature crude silicon in molten aluminum to form a liquid mixture of silicon and aluminum having a solidification temperature not below 577° C. and containing at least 11 atomic percent silicon; lowering the temperature of the liquid mixture to a value not below the solidification temperature of the liquid mixture but sufficient to crystallize out platelets of relatively pure silicon; recovering said platelets from said liquid mixture; removing a solidified silicon-aluminum coating from said platelets, retained thereon upon removal of said platelets from said solution and upon subsequent cooling; and washing the relatively pure silicon platelets.

2. The process described in claim 1 wherein said silicon-aluminum coating is removed by dissolving the aluminum contained therein, and said silicon platelets are mechanically separated from the residue left after dissolving said aluminum.

3. The process described in claim 1 wherein the temperature of the liquid mixture is lowered at least 15° C.

4. The process described in claim 1 wherein the crude silicon is dissolved in molten aluminum at a temperature between about 577° C. and 950° C.

5. The process described in claim 1 wherein the recovered platelets are melted and subsequently further purified with silicon tetrachloride vapor.

References Cited in the file of this patent

UNITED STATES PATENTS

| | | |
|---|---|---|
| 589,415 | De Chalmot | Sept. 7, 1897 |
| 1,241,796 | Weaver | Oct. 2, 1917 |
| 1,386,227 | Becket | Aug. 2, 1921 |
| 2,091,898 | Weber | Aug. 31, 1937 |
| 2,469,418 | Striplin | May 10, 1949 |
| 2,613,136 | McKay | Oct. 7, 1952 |
| 2,615,793 | Weedman | Oct. 28, 1952 |
| 2,615,794 | Shelby | Oct. 28, 1952 |
| 2,675,303 | Sobek et al. | Apr. 13, 1954 |
| 2,747,971 | Hein | May 29, 1956 |
| 2,916,359 | Ellis | Dec. 8, 1959 |
| 2,937,929 | Voos | May 24, 1960 |
| 2,956,863 | Goorissen | Oct. 18, 1960 |

FOREIGN PATENTS

| | | |
|---|---|---|
| 577,976 | Great Britain | June 11, 1946 |

UNITED STATES PATENT OFFICE
CERTIFICATE OF CORRECTION

Patent No. 3,097,068                                July 9, 1963

Lawrence M. Litz et al.

It is hereby certified that error appears in the above numbered patent requiring correction and that the said Letters Patent should read as corrected below.

Column 2, line 71, after "the", first occurrence, insert -- end --.

Signed and sealed this 21st day of January 1964.

(SEAL)
Attest:
ERNEST W. SWIDER

Attesting Officer

EDWIN L. REYNOLDS

Acting Commissioner of Patents